United States Patent [19]

Clark

[11] Patent Number: 5,259,336
[45] Date of Patent: Nov. 9, 1993

[54] COMBINED AUTOMATIC PET WATERER AND FEEDER

[75] Inventor: Fred C. Clark, Arlington, Tex.

[73] Assignee: Blitz-U.S.A., Miami, Okla.

[21] Appl. No.: 810,956

[22] Filed: Dec. 19, 1991

[51] Int. Cl.$^5$ .............................................. A01K 7/00
[52] U.S. Cl. .................................................. 119/51.5
[58] Field of Search .................. 119/51.5, 52.1, 51.01, 119/56.1, 61

[56] References Cited

U.S. PATENT DOCUMENTS

| D. 251,392 | 3/1979 | Futers et al. | D30/13 |
|---|---|---|---|
| D. 257,692 | 12/1980 | Thayer | D30/13 |
| D. 278,371 | 4/1985 | Strickland | D30/13 |
| D. 289,208 | 4/1987 | Fanciullo | D30/13 |
| D. 289,808 | 5/1987 | Gardner | D30/13 |
| D. 294,750 | 3/1988 | Atchley | D30/132 |
| D. 296,371 | 6/1988 | Lorenzana et al. | D30/122 |
| D. 300,277 | 3/1989 | Clark | D30/122 |
| D. 315,037 | 2/1991 | Clark | D30/122 |
| 2,573,802 | 11/1951 | Mitchell | 119/77 |
| 3,720,184 | 3/1973 | Pearce | 119/51.5 |
| 3,730,141 | 5/1973 | Manning et al. | 119/51.5 |
| 4,134,365 | 1/1979 | Futers et al. | 119/51.5 |
| 4,192,256 | 3/1980 | Clugston | 119/51.5 |
| 4,315,483 | 2/1982 | Scheidler | 119/51.5 X |
| 4,573,434 | 3/1986 | Gardner | 119/77 |
| 4,721,063 | 1/1988 | Atchley | 119/52 R |
| 4,840,143 | 6/1989 | Simon | 119/52.1 |
| 5,016,572 | 5/1991 | Weber et al. | 119/52.1 |

FOREIGN PATENT DOCUMENTS

| 682630 | 3/1964 | Canada | 119/46 |
|---|---|---|---|
| 2368220 | 6/1978 | France | 119/77 |

Primary Examiner—Gene Mancene
Assistant Examiner—Thomas Price
Attorney, Agent, or Firm—Dougherty, Hessin, Beavers & Gilbert

[57] ABSTRACT

A combined automatic pet waterer and feeder. A water dish portion is designed to receive the neck of a commonly available soft drink bottle for a storage tank. Water flows from the bottle through a bottle-holding support portion into a water reservoir section for drinking by an animal. A food dish portion has a food container support section and a food reservoir section for receiving food from the food container support section. The food container support section is adapted for receiving one of a variety of commonly available containers. The food dish has an inner wall with a shelf extending therefrom and a ring spaced inwardly from the inner wall. In one embodiment, the ring has a threaded inner surface adapted for threaded engagement with the mouth of a container in which pet food is sold. In another embodiment, the recess is adapted for receiving an open lower end of another type of container, such as a typical coffee can. When the bottle and food container are not installed, the waterer and feeder apparatus is compact for easy storage.

22 Claims, 4 Drawing Sheets

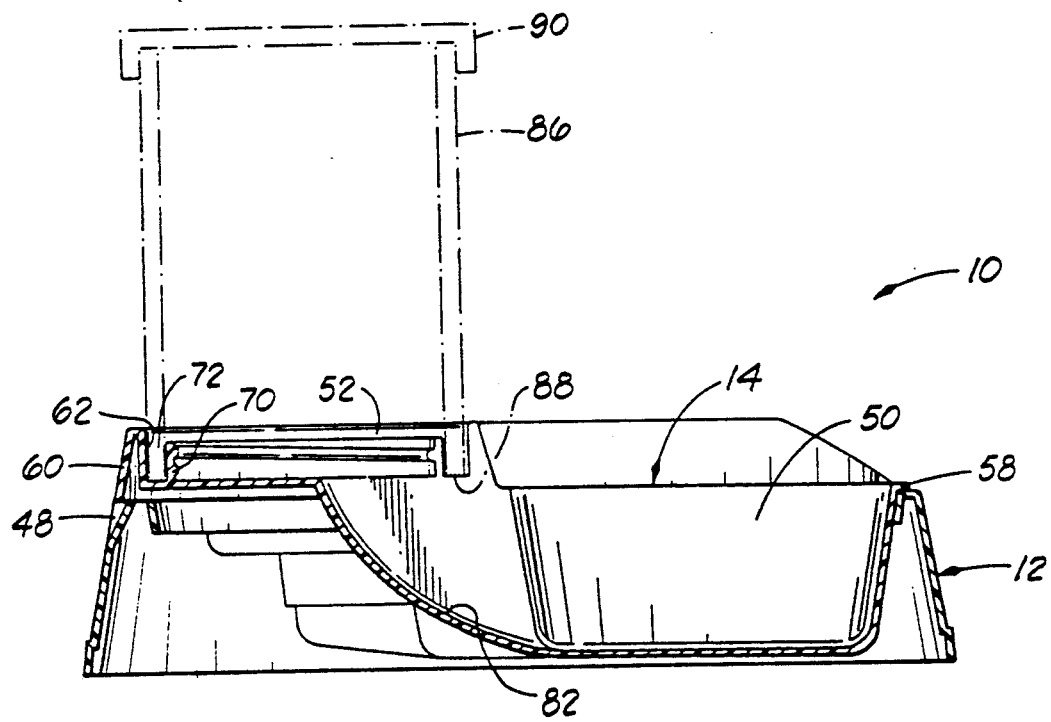
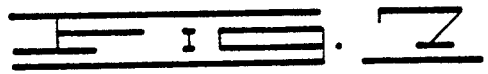

COMBINED AUTOMATIC PET WATERER AND FEEDER

BACKGROUND OF THE INVENTION

1. Field Of The Invention

This invention relates to pet waterers and feeders for automatically providing water and food to animals over a period of time, and more particularly, to a combined waterer and feeder having a food dish, preferably removable, which is usable with a plurality of commonly available containers for food storage and further having a waterer usable with a commonly available soft drink bottle for a storage tank.

2. Description Of The Prior Art

The prior art relating to pet waterers and feeders is mostly directed at devices utilizing specially made storage containers or tanks for the food and water. These specially made parts tend to make the pet waterers and feeders expensive and also make them bulky when not in use.

The present invention utilizes a commonly available soft drink bottle for a water storage tank and other available items, such as the container in which pet food is sold, an empty coffee can, or the like, for storage of the food. This results in a pet waterer and feeder which is considerably less expensive than those of the prior art. Because the bottle and food containers may be discarded and replaced at essentially no cost, the apparatus itself, which is fairly compact, is all that must be stored when not in use.

SUMMARY OF THE INVENTION

The present invention is a combined pet waterer and feeder apparatus comprising a water dish portion and a food dish portion. Preferably, the food dish portion is removable from the water dish portion. The invention may also be considered to comprise a stand alone food dish.

The food dish portion is preferably of one-piece, molded construction, as is the water dish portion. The water dish portion has an upwardly facing surface defining a food dish opening therein, and the food dish portion is disposed in the opening. Preferably, the food dish portion has a lip thereon for engaging this upwardly facing surface. Also, the upwardly facing surface may have a lug extending upwardly therefrom adjacent to the opening, with the food dish portion defining a groove therein adapted for receiving the lug. In this way, the food dish portion is at least partially located with respect to the water dish portion when the food dish portion is disposed in the opening. The water dish portion may define a finger recess in the upwardly facing surface adjacent to the opening, thereby facilitating removal of the food dish portion from the water dish portion.

The water dish portion comprises a bottle-holding section and a water reservoir section in communication with the bottle-holding section for receiving water therefrom. The bottle-holding section comprises a bottle support portion adapted for engaging an outer surface of a bottle further comprises and a bottle neck receiving portion below the bottle support portion. The bottle neck receiving portion is adapted for receiving a neck of the bottle. The bottle may be of a commonly available type, such as a one-, two- or three-liter soft drink bottle. In the preferred embodiment, a conduit provides communication between the bottle-holding section and the water reservoir section.

The food dish portion comprises a food container support section and a food reservoir section in communication with the food container support section for receiving food therefrom. The food container support portion comprises a shelf and means for receiving an open lower end of the pet food container. In the preferred embodiment, this means for receiving comprises an inner wall extending upwardly from the shelf, and a ring extending upwardly from the shelf and spaced inwardly from the outer wall such that a recess is defined therebetween. The recess is adapted for selectively receiving an open end of one type of pet food container, and the ring defines an inner surface adapted for selective engagement with a mouth of a second type of food container. The inner surface of the ring may be a threaded inner surface for threaded engagement with the corresponding pet food container.

The pet food container engaged with the inner surface of the ring may be of a commonly available type, such as the actual container in which the pet food is sold. The container received by the recess may also be of a commonly available type, such as a coffee can with the bottom removed. Any of these containers may have an open upper end with a lid for selective closure of the upper end.

In the preferred embodiment, a ramp extends downwardly from the food container support section to the food reservoir section. The food travels down this ramp into the food reservoir section. The inner wall and ring of the food container support section may have aligned notches therein. Side walls of the ramp may generally be considered extensions of these notches.

Numerous objects and advantages of the invention will become apparent as the following detailed description of the preferred embodiment is read in conjunction with the drawings which illustrate such embodiment.

BRIEF DESCRIPTION OF THE DRAWINGS

FIG. 7 is a cross-sectional view taken along lines 5—5 in FIG. 1 and showing an empty coffee can or the like being used as a food container.

DESCRIPTION OF THE PREFERRED EMBODIMENT

Figure 1:
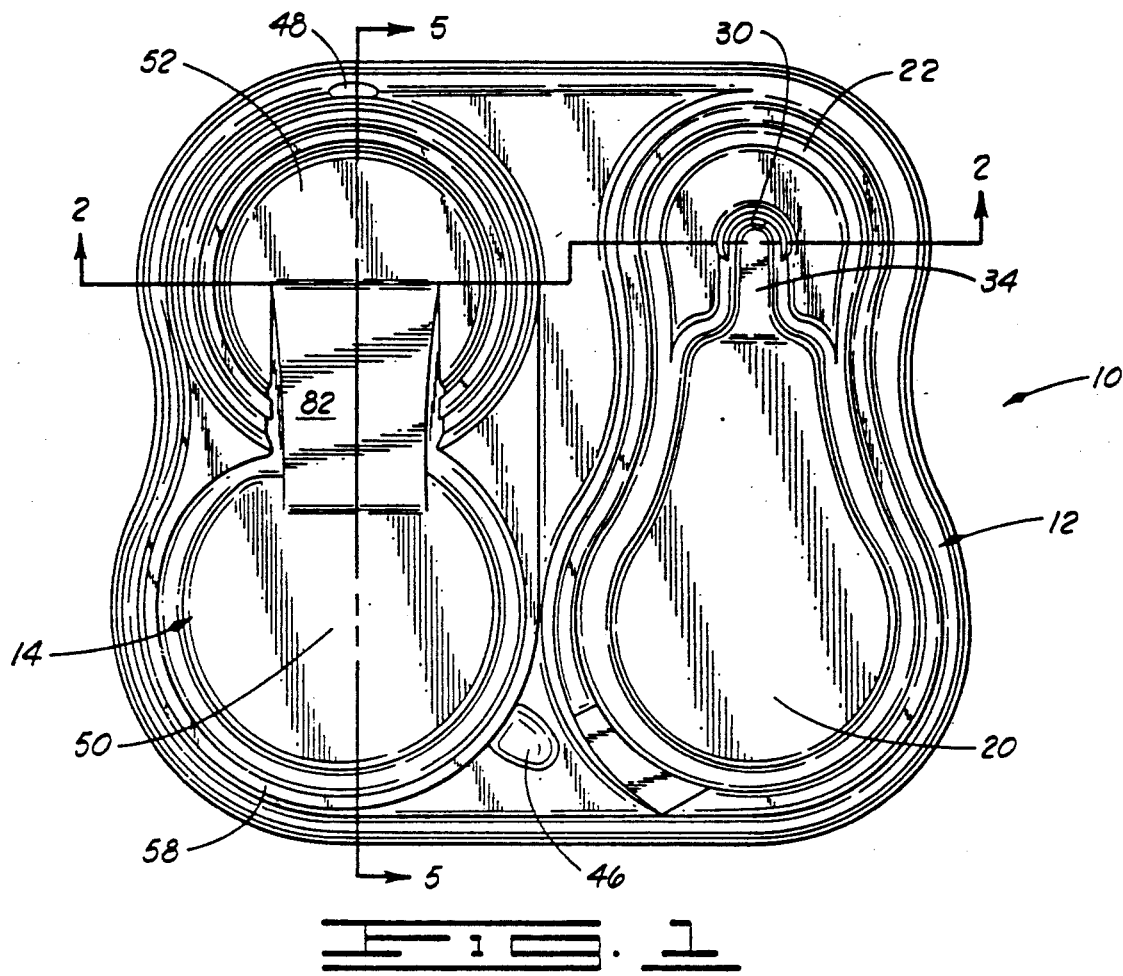
FIG. 1 shows a plan view of the combined automatic pet waterer and feeder with removable food dish of the present invention.

Referring now to the drawings, the combined automatic pet waterer and feeder apparatus of the present invention is shown and generally designated by the numeral 10. Apparatus 10 comprises a water dish or base portion 12 and a food dish portion 14.

Figure 2:
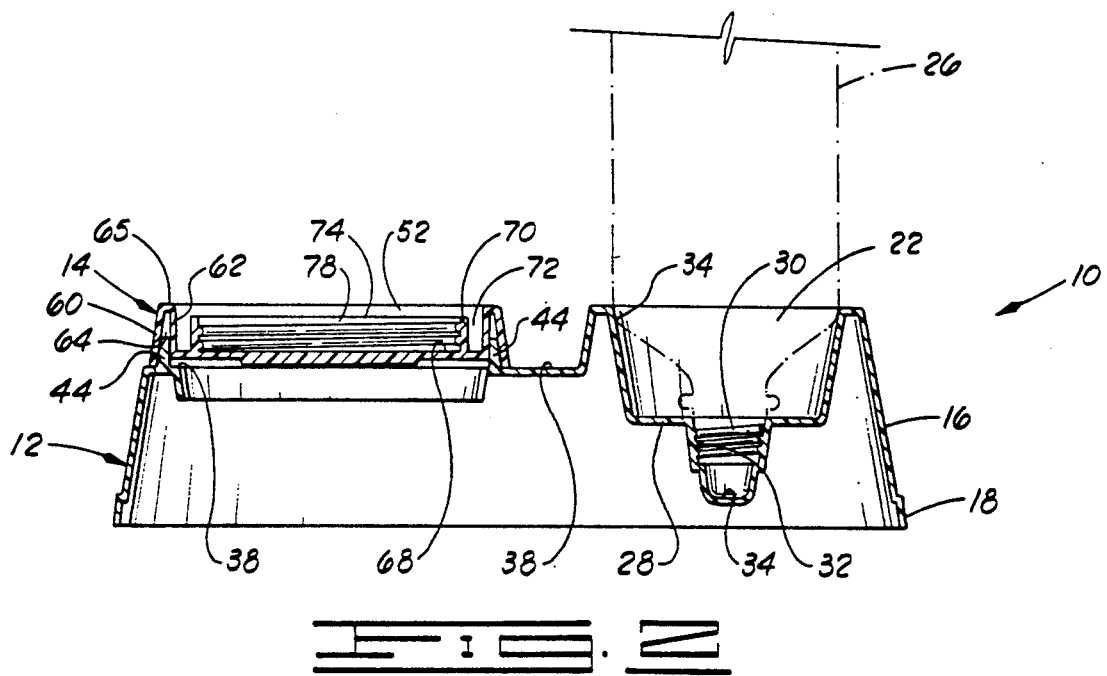
FIG. 2 is a cross section taken along lines 2—2 in FIG. 1.
Figure 3:
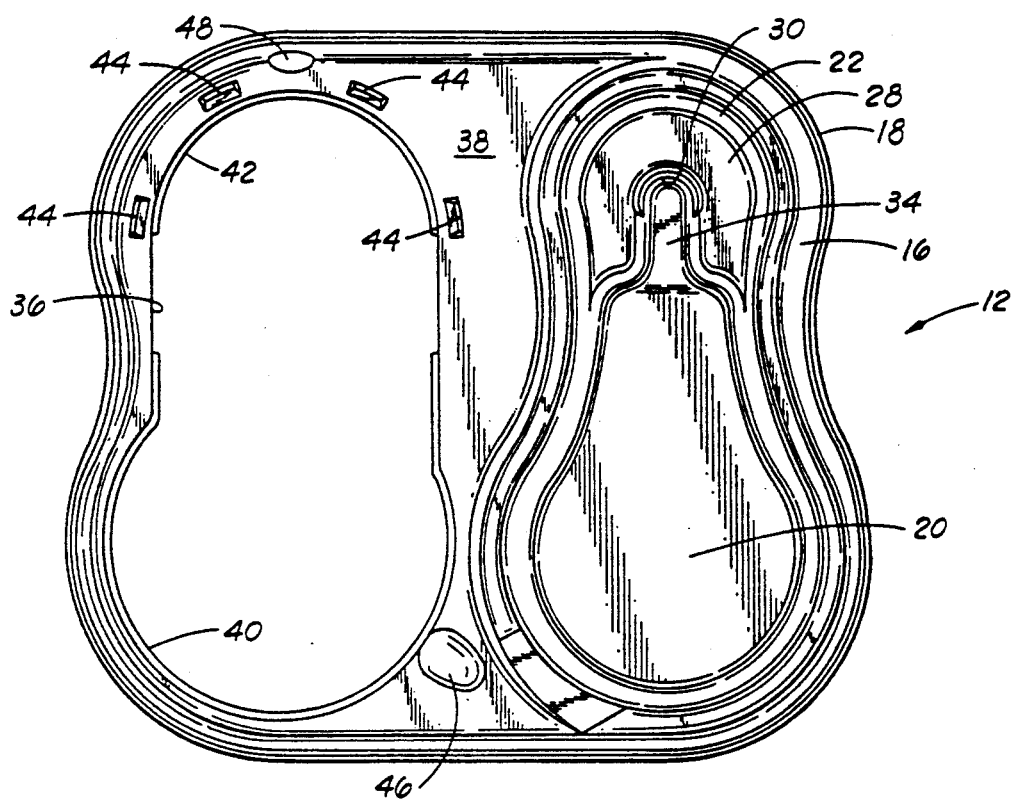
FIG. 3 is a plan view of the base and water dish portion of the apparatus with the food dish removed.
Figure 5:
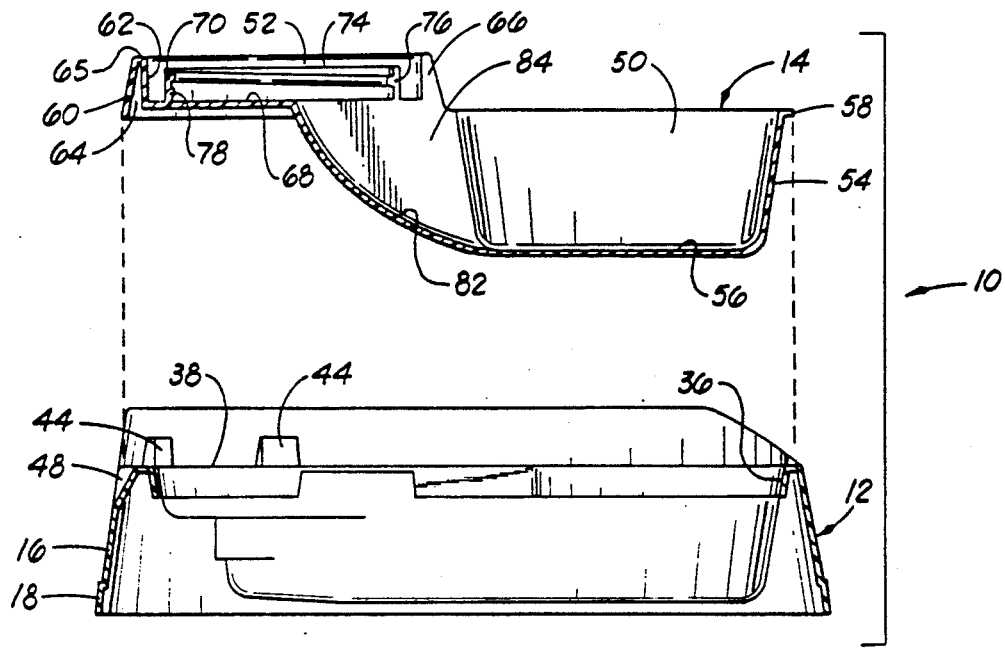
FIG. 5 is an exploded view cross section taken lines 5—5 of FIG. 1.

Referring to FIGS. 2, 3 and 5, the details of water dish or base portion 12 will be discussed. Base portion 12 is made of a flexible material of one-piece, molded construction having an outer wall 16 with a perimeter lip 18 at a lower edge thereof which acts as reinforcement.

A portion of base 12 forms a water reservoir section 20 which as seen in FIG. 3 is generally pear-shaped. Located rearwardly of water reservoir section 20 is a bottle-holding section 22. Bottle-holding section 22 is positioned at a higher level than the bottom of water reservoir section 20. Bottle-holding section 22 has an upper holding or bottle support portion 24 which is adapted for supporting a bottle 26. In one embodiment, bottle-support portion 24 is adapted for frictionally holding an outer surface of bottle 26 and is dimensioned to conform thereto.

In the preferred embodiment, but not by way of limitation, bottle 26 is a conventional, plastic soft drink bottle. Typically, these bottles are sold in one-liter, two-liter and three-liter sizes. The apparatus may be sized to accommodate any of these bottle capacities or others.

In the embodiment in which bottle support portion 24 frictionally holds bottle 26, if a bottle is used which is relatively less flexible than the apparatus, bottle-support portion 24 will be radially outwardly and elastically deformed to tightly grip the bottle. If a bottle relatively more flexible than the apparatus is used, the outer surface of the bottle will be radially inwardly compressed so that bottle-holding section 22 tightly grips the bottle. Thus, either bottle-support portion 24 or bottle 26 is relatively more flexible than the other. In the preferred embodiment, the apparatus is made of a plastic which is relatively less flexible than a conventional, plastic soft drink bottle.

A shoulder 28 extends inwardly from bottle support portion 24 and defines a bottle neck receiving recess 30, best seen in FIG. 2. Recess 30 has an internally threaded surface 32 which is adapted for threaded engagement with the neck of bottle 26. Again, recess 30 and threaded surface 32 may be sized to accommodate a one-, two- or three-liter soft drink bottle or the like. Thus, bottle-support portion 24 and bottle neck receiving recess operate to retain and support bottle 26 in a substantially inverted position as seen in FIG. 2.

An upwardly opening water conduit 34 interconnects bottle neck receiving recess 30 of bottle-holding section 22 with reservoir section 20.

Referring again to FIG. 3, a food dish opening 36 is defined in an upwardly facing surface 38 of base 12. As will be further described herein, opening 36 is adapted for receiving food dish 14. An inwardly extending reinforcing wall 40 is formed around a forward portion of opening 36 and extends downwardly. A similar reinforcing wall 42 is defined around a rear portion of opening 36. Adjacent to wall 42 and opening 36, a plurality of lugs 44 extend upwardly from surface 38. Although four such lugs 44 are shown in FIG. 3, the invention is not intended to be limited to any particular number.

Near the front of food dish opening 36 a finger or thumb recess 46 is defined in surface 38. Another finger or thumb recess 48 is defined in surface 38 near the rear of opening 36.

In operation of water dish portion 12, bottle 26 is filled with water and installed in a substantially inverted position in bottle-holding section 22 such that the neck of the bottle is engaged with threaded surface 32 in bottle neck receiving recess 30. Water drains out bottle 26, through bottle neck receiving recess 30 into water conduit 34, and then flows through the conduit into water reservoir section 20. The water level rises until it reaches the neck of bottle 26 at which point water automatically ceases to flow out the bottle. Reservoir section 20 is sized such that only a small portion of the water contained in bottle 26 is required to fill the reservoir to this point. Bottle 26 thus acts as a storage tank of water for later use. As the water level is lowered, such as by drinking by an animal or by evaporation, an additional quantity of water automatically will drain from bottle 26 to refill reservoir section 20. Bottle 26 can be filled and the apparatus left unattended for extended periods of time to provide a constant supply of fresh water for drinking by animals.

Figure 4:
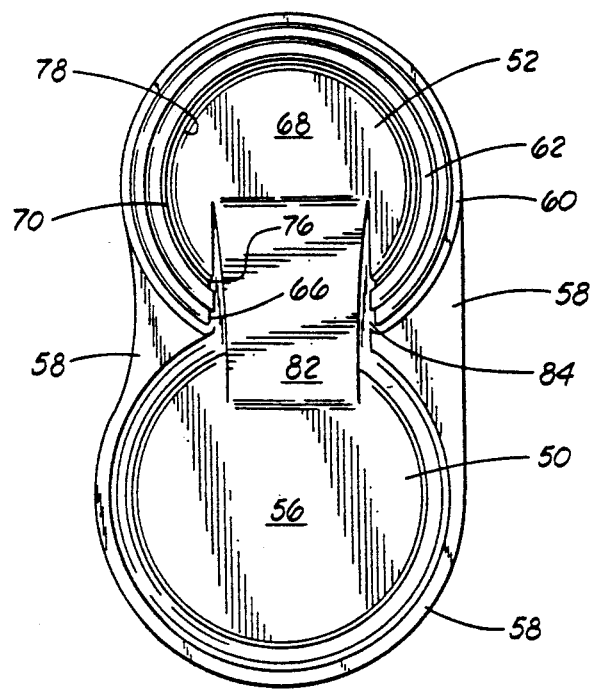
FIG. 4 is a plan view of the removable food dish.

Referring now to FIGS. 2, 4 and 5, the details of food dish 14 will be discussed. Food dish 14 is preferably removable from base 12 At the forward end of food dish 14 is a food reservoir section 50 which has a generally round, downwardly tapered configuration and therefore may also be referred to as a food bowl section 50. At the rear of food dish 14 is a food container support portion 52 which, as will be further described herein, is adapted for holding different types of food containers.

Food dish 14 is preferably made of the same flexible material of one-piece, molded construction as is base 12.

Food reservoir section 50 has an outer wall 54 forming the bowl with a bottom surface 56 at the lower end thereof. A lip 58 extends around food reservoir section 50 and rearwardly toward food container support portion 52, as best seen in FIG. 4. Thus, lip 58 extends around at least a portion of food reservoir section 50 and food container support portion 52.

Food container support portion 52 has an outer wall 60 and an inner wall 62 which define a downwardly opening groove 64 therebetween. Inner wall 62 is substantially cylindrical. Outer wall 60 and inner wall 62 jointly form an upper edge 65.

As best seen in FIG. 4, a notch 66 is formed in outer and inner walls 60 and 62 and thus defines an opening therein on the forward side of the walls.

A substantially horizontal shelf 68 extends inwardly from inner wall 62 and thus forms a bottom surface of food container support portion 52. A substantially annular ring 70 extends upwardly from shelf 68 such that a substantially annular recess 72 is defined between ring 70 and inner wall 62. That is, ring 70 is spaced radially inwardly from inner wall 62. Ring 70 has an upper edge 74. It will be seen that the bottom of annular recess 72 is also defined by shelf 68. Thus, the bottom of recess 72 is aligned with the bottom of the food container support portion 52.

In the embodiment shown, upper edge 74 of ring 70 is below upper edge 65 of outer and inner walls 60 and 62, but the invention is not intended to be so limited.

A notch 76 is formed in ring 70 and is generally aligned with notch 66 in outer and inner walls 60 and 62. Thus, notch 76 forms an opening in the forward portion of ring 70.

Figure 6:
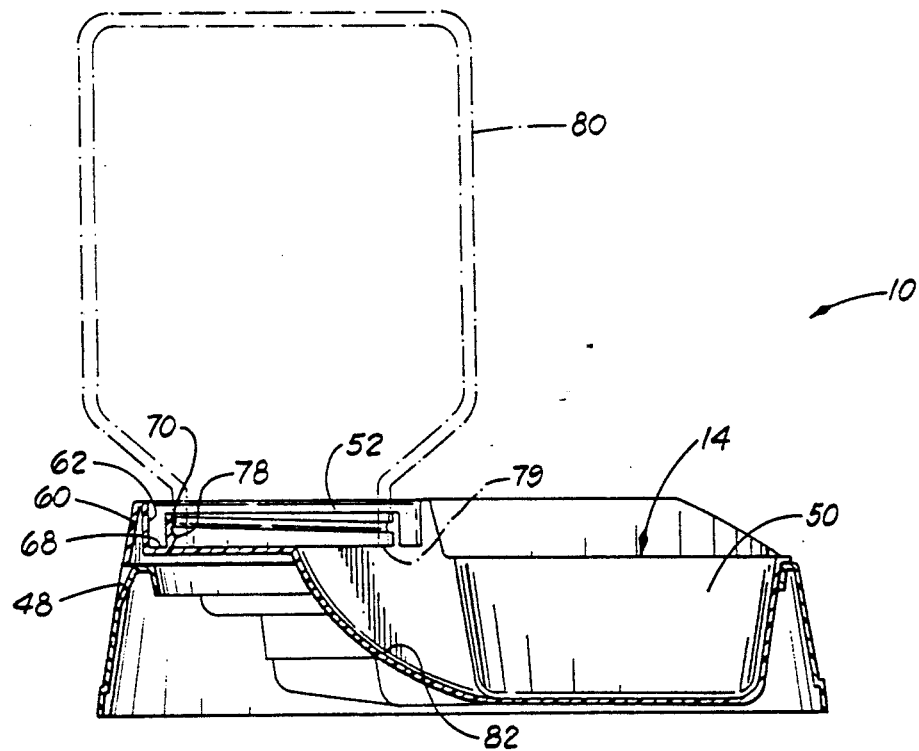
FIG. 6 is a cross-sectional view taken along lines 5—5 of FIG. 1 and showing installation of a pet food container being used for food storage.

Ring 70 preferably defines an internally threaded surface 78 which is adapted for threaded engagement with the neck of a pet food container of a kind known in the art. For example, but not by way of limitation, threaded surface 78 may be adapted for engagement with the neck or mouth 79 of a container 80 in which Purina Deli-Cat brand cat food is sold. This is illustrated in FIG. 6. The usage of food dish 14 will be further described herein.

As best seen in FIG. 5, shelf 68 of food container support portion 52 is disposed at a higher level than bottom surface 56 of food reservoir section 50. A curvilinear ramp 82 intersects shelf 68 and extends downwardly therefrom, blending into bottom surface 56. A pair of side walls 84 are disposed on opposite sides of ramp 82. In the preferred embodiment, side walls 84 are aligned with and generally help form notches 66 and 76.

Referring now to FIGS. 1, 2, 6 and 7, food dish 14 is shown disposed in food dish opening 36 in base 12. Lip 58 on food dish 14 rests on upper surface 38 of base 12, thereby providing support for the food dish. To further assist in alignment of food dish 14 and to provide rigidity in the assembled apparatus 10, lugs 44 on base 12 extend upwardly into groove 64 in food dish 14. Food reservoir section 50 extends well below upper surface 38 of base 12. Thus, it will be seen that food dish 14 when so positioned on base 12 is rigidly held in place and cannot become easily dislodged accidentally.

To remove food dish 14, a person may insert a finger or thumb into finger recesses 46 and 48 which allows the fingers to be below lip 58 and outer wall 60, respectively, so that the food dish can be easily lifted from base 12.

In one operation of the food dish, as previously mentioned, a food container with a threaded neck or mouth may be threadingly engaged with threaded surface 78 in ring 70. To do this, food dish 14 is removed from base 12 as previously described and inverted. In this inverted position, it may then be threaded onto the neck or mouth 79 of container 80 when container 80 is in its upright position. This assembly of container 80 and food dish 14 may then be inverted and food dish 14 inserted into opening 36 in base 12. The food will fall from container 18 and down ramp 82 into food reservoir portion 50. Once a sufficient amount of food builds up in food reservoir section 50, this flow of food from container 18 will naturally stop. As an animal eats the food and thereby lowers the food level, additional amounts of food will flow from container 80 into the food reservoir portion.

Referring now to FIG. 7, an alternate operation of food dish 14 is shown. In this embodiment, a substantially cylindrical food container 86 with an open bottom 88 is shown. Food dish 14 is sized such that container 86 fits into recess 72 between ring 70 and inner wall 62 and thus rests on a portion of shelf 68. In one embodiment, the apparatus is sized for a container 86 which is a typical coffee can with the bottom removed. A lid 90, such as the plastic lip which comes with such a coffee can, may be used to close the top of container 86. Once container 86 is positioned in recess 72, it is a simple matter to remove lid 90 and pour the food into container 86, and then reclose it with lid 90. The food will fall into reservoir section 50 in the manner previously described.

While food dish 14 has been described as a removable portion of apparatus 10, it will be understood by those skilled in the art that the primary features of the food dish may be incorporated into a stand alone food dish as well. That is, a stand alone food dish could be made which incorporates food container support portion 52, including the described means for receiving different types of food containers, ramp 82 and food reservoir section 50. The invention is not intended to be limited to a food dish which is only designed to fit within base 12.

It will be seen, therefore, that the combined automatic pet waterer and feed with removable food dish of the present invention is well adapted to carry out the ends and advantages mentioned as well as those inherent therein. While presently preferred embodiments of the invention have been shown for the purposes of this disclosure, numerous changes in the arrangement and construction of parts may be made by those skilled in the art. All such changes are encompassed within the scope and spirit of the invention as defined by the appended claims.

What is claimed is:

1. A pet food dish for use with one of a plurality of types of pet food containers, said pet food dish comprising:
   a food container support section for holding said one of the plurality of types of pet food containers, said food container support section comprising:
   a wall;
   a shelf extending from said wall; and
   a ring extending upwardly from said shelf and spaced from said wall such that a recess is defined therebetween, said recess being adapted for selectively receiving an open end of a first type of food container, and said ring defining a surface adapted for selective engagement with a mouth of a second type of food container; and
   a food reservoir section for receiving pet food therein from said food container support section.

2. The food dish of claim 1 wherein said food container support section and said food reservoir section are integrally formed.

3. The food dish of claim 1 further comprising a ramp extending between said food container support section and said food reservoir section.

4. The food dish of claim 1 further comprising a lip extending outwardly from at least a portion of said food container support section and said food reservoir section.

5. The food dish of claim 1 wherein said recess is sized to receive an open lower end of a coffee can.

6. The food dish of claim 1 wherein said surface of said ring is a threaded surface adapted for threaded engagement with said mouth of said second type of food container.

7. The food dish of claim 6 wherein said threaded surface is a threaded inner surface.

8. The food dish of claim 1 wherein said wall and said ring define aligned notches therein.

9. The food dish of claim 1 wherein:
   said wall is an inner wall; and
   said shelf extends inwardly from said inner wall.

10. A pet waterer and feeder apparatus comprising:
    a water dish portion comprising:
       a bottle-holding section comprising:
          a bottle support portion adapted for engaging an outer surface of a bottle; and
          a bottle neck receiving portion below said bottle support portion and adapted for receiving a neck of said bottle; and
       a water reservoir section in communication with said bottle-holding section for receiving water therefrom; and
    a food dish portion comprising:
       a food container support section comprising: a shelf; and
          means for receiving an open lower end of a pet food container adjacent to said shelf; and
       a food reservoir section in communication with said food container support section for receiving food therefrom.

11. The apparatus of claim 10 wherein said food dish portion is removable from said water dish portion.

12. The apparatus of claim 11 wherein:
   said water dish portion has an upwardly facing surface defining a food dish opening therein; and
   said food dish portion is disposed in said opening.

13. The apparatus of claim 12 wherein said food dish portion has a lip thereon for engaging said upwardly facing surface.

14. The apparatus of claim 12 wherein said water dish portion defines a finger recess in said upwardly facing surface adjacent to said opening, thereby facilitating removal of said food dish portion from said water dish portion.

15. The apparatus of claim 10 wherein said means for receiving comprises:
   an inner wall extending upwardly from said shelf; and
   a ring extending upwardly from said shelf and spaced inwardly from said inner wall such that a recess is defined therebetween, wherein:
   said recess is adapted for receiving an open end of one type of pet food container; and
   said ring defines an inner surface for engagement with a mouth of another type of pet food container.

16. The apparatus of claim 15 wherein said inner surface of said ring is threaded.

17. The apparatus of claim 15 further comprising:
   a pet food container of one of said types, said container having an open upper end; and
   a lid for selective closure of said upper end.

18. The apparatus of claim 10, further comprising a conduit providing communication between said bottle holding section and said water reservoir section.

19. The apparatus of claim 10 further comprising a ramp extending downwardly from said food container support section to said food reservoir section.

20. The apparatus of claim 10 wherein said water dish portion is of one-piece construction.

21. The apparatus of claim 10 wherein said food dish portion is of one-piece construction.

22. A pet waterer and feeder apparatus comprising:
   a water dish portion comprising:
      an upwardly facing surface defining a food dish opening therein and having a lug extending upwardly therefrom adjacent to said food dish opening;
      a bottle-holding section comprising:
         a bottle support portion adapted for engaging an outer surface of a bottle; and
         a bottle neck receiving portion below said bottle support portion and adapted for receiving a neck of said bottle; and
      a water reservoir section in communication with said bottle-holding section for receiving water therefrom; and
   a food dish portion disposed in said food dish opening and removably from said water dish portion, said food dish portion comprising:
      a food container support section comprising:
         a shelf; and
         means for receiving an open lower end of a pet food container adjacent to said shelf; and
      a food reservoir section in communication with said food container support section for receiving food therefrom;
   wherein, said food dish portion defines a groove therein adapted for receiving said lug, thereby at least partially locating said food dish portion when said food dish portion is disposed in said food dish opening.

* * * * *